US006292329B1

(12) United States Patent
Sato et al.

(10) Patent No.: US 6,292,329 B1
(45) **Date of Patent: *Sep. 18, 2001**

(54) THIN FILM SINGLE MAGNETIC HEAD

(75) Inventors: Jin Sato; Yoshihisa Nakamura; Hiroaki Muraoka; Toru Katakura, all of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,663

(22) Filed: Oct. 1, 1998

(30) Foreign Application Priority Data

Oct. 2, 1997 (JP) ..................................................... 9-270172

(51) Int. Cl.[7] ..................................................... G11B 5/147
(52) U.S. Cl. ......................................... 360/126; 29/603.14
(58) Field of Search .................................... 360/126, 121, 360/123, 104, 119, 317, 322; 29/603.13, 603.14

(56) References Cited

U.S. PATENT DOCUMENTS 4,751,598 * 6/1988 Hamilton ............................. 360/110
5,671,106 * 9/1997 Lehureau ............................. 360/121
5,703,740 * 12/1997 Cohen et al. ........................ 360/126
5,757,592 * 5/1998 Arai et al. ............................ 360/123
5,828,533 * 10/1998 Ohashi et al. ....................... 360/126
5,936,814 * 8/1999 Slade et al. .......................... 360/126
6,002,555 * 12/1999 Tagawa ................................ 360/126
6,038,106 * 3/2000 Aboafe et al. ....................... 360/317

FOREIGN PATENT DOCUMENTS

355004734A * 1/1980 (JP) .
355012522A * 1/1980 (JP) .
55-12522A * 1/1980 (JP) .
55-4734A * 1/1980 (JP) .

* cited by examiner

*Primary Examiner*—William Klimowicz
*Assistant Examiner*—Tianjie Chen
(74) *Attorney, Agent, or Firm*—Sonnenschein, Nath & Rosenthal

(57) ABSTRACT

A thin-film single magnetic pole head which assures highly efficient magnetic energization of a main magnetic pole and which exhibits optimum recording characteristics even in case of recording on a double-layer perpendicular magnetic recording medium with a high frequency. The thin-film single magnetic pole head includes a main magnetic pole consisting of a soft magnetic thin film and a return yoke. A thin-film coil for energizing the main magnetic pole is constituted by a plurality of conductor layers extending substantially parallel to one another and substantially at right angles to the main magnetic pole. The conductor layers are layered together in the up-and-down direction on both sides of the main magnetic pole. A thin-film coil for magnetically energizing the main magnetic pole is constituted by selectively interconnecting the conductors. In this manner, the thin-film coil can be arranged at the foremost part of the main magnetic pole (towards the perpendicular magnetic recording medium facing surface) to render it possible to energize the foremost part of the main magnetic pole with high efficiency.

2 Claims, 9 Drawing Sheets

10b 8a 2 2b 10a 9a 8 2a 10 9 3

2 11 10 7 6 9 5 8 4 3 1

THIN FILM SINGLE MAGNETIC HEAD

BACKGROUND OF THE INVENTION

1. Field of the Invention

This invention relates to a single magnetic pole head used as a recording head in a perpendicular magnetic recording system. More particularly, it relates to a thin-film single magnetic pole head in which the main magnetic pole is formed by a soft magnetic thin film.

2. Description of the Related Art

In the field of magnetic recording, such as in a hard disc or a floppy disc, recording density is increasing drastically, such that 1 Gbit/square inch or even 10 Gbit/square inch is not unlikely to be reached.

In magnetic recording system, so-called longitudinal recording system (in-plane recording system) is customary, and a longitudinal recording medium is routinely used for recording/reproduction. If the recording density reaches the order of 10 Gbits/square inch, recording demagnetization poses a problem because the diamagnetic coefficient is increased in the case of the longitudinal recording medium.

Also, for high recording density, the recording frequency needs to be increased, such that, in a recording head, it is necessary to decrease the inductance in order to decrease the rise time of the writing current waveform. Although it is attempted to form the recording coil in two layers, such attempt occasionally leads to a complicated process.

Under these circumstances, attention is again directed to the perpendicular magnetic recording system, which can maintain stable magnetization despite high recording density.

In the perpendicular magnetic recording system, there is required a magnetic head capable of recording on a perpendicular magnetic recording medium. For example, in a single-layer perpendicular magnetic recording medium, writing is possible by a so-called ring head. However, with a double-layer perpendicular magnetic recording medium, having a high magnetic permeability layer below the magnetic layer, recording characteristics in a higher frequency are deteriorated because of recording demagnetization, although recording is possible with the ring head. Thus, there is raised a demand for a recording head exhibiting superior recording characteristics even in a high frequency range.

In order to meet the demand for improved recording density, high resolution is achieved by increasing coercivity and reducing the film thickness. In a recording head, there have been attempts to increase saturation density of a recording core and to increase frequency characteristics of magnetic permeability of a recording core material, in order to cope with increased coercivity of a recording medium, while attempting to establish a manufacturing method for a narrow track head and to provide a double-layer recording coil in order to cope with high track density and in order to reduce head inductance to cope with the high linear recording density.

Although there have been attempts to reduce the film thickness of the main magnetic pole in the magnetic head of the perpendicular magnetic recording system, it is necessary to energize the foremost part of the main magnetic pole with high efficiency.

Notwithstanding past efforts to improve the recording head in this line, there has not been found a practically satisfactory head structure.

SUMMARY OF THE INVENTION

It is an object of the present invention to provide a thin-layer single magnetic pole head which enables highly efficient energization of the main magnetic pole and which exhibits optimum recording characteristics even in case of high frequency recording on a double-layer perpendicular magnetic recording medium.

The present invention provides a thin-film single magnetic pole head including a main magnetic pole constituted by a soft magnetic thin film, and a return yoke, wherein the improvement resides in that a thin-film coil for energizing the main magnetic pole is constituted by a plurality of conductor layers extending substantially parallel to one another and substantially at right angles to the main magnetic pole. The conductor layers are layered together in the up-and-down direction on both sides of the main magnetic pole, and a thin-film coil for magnetically energizing the main magnetic pole is constituted by selectively interconnecting the conductors.

By arranging the thin-film coil by plural conductor layers layered above and below the main magnetic pole for extending substantially parallel to one another, the thin-film coil can be arranged in the vicinity of the distal end of the main magnetic pole (towards the perpendicular mem facing surface).

The result is that the distal end of the main magnetic pole can be efficiently energized by the magnetic field generated by this thin-film coil to realize superior recording characteristics even in case of recording to a high frequency on a double-layer perpendicular magnetic recording medium.

DESCRIPTION OF THE PREFERRED EMBODIMENTS

Figure 1:
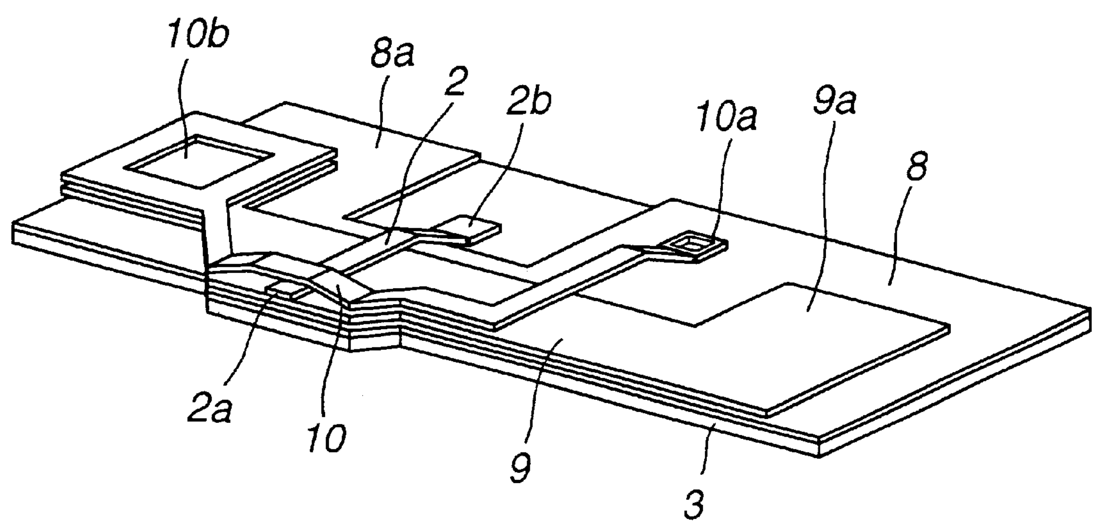
FIG. 1 is a schematic perspective view showing an illustrative structure of a thin-film single magnetic pole head embodying the present invention.
Figure 2:
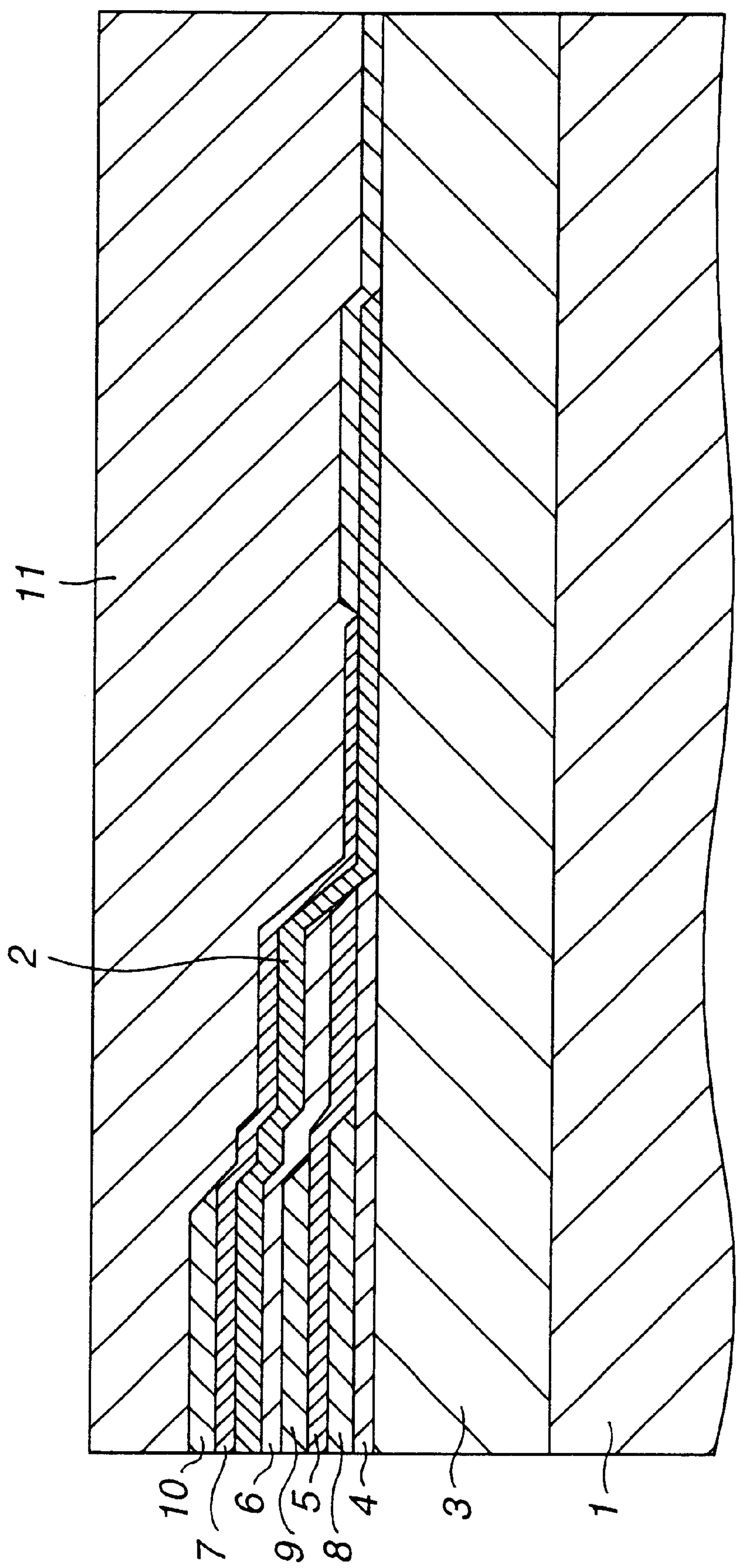
FIG. 2 is a schematic cross-sectional view showing an illustrative structure of a thin-film single magnetic pole head embodying the present invention.

Referring to the drawings, the structure of the thin-film single magnetic pole head embodying the present invention will be explained in detail.

The thin-film single magnetic pole head of the present invention is used for recording signals on a double-layer perpendicular magnetic recording medium and includes a slider 1 as a substrate, a strip-shaped main magnetic pole 2 formed on the slider 1 for applying a recording magnetic field on the perpendicular magnetic recording medium, and a return yoke 3 as a magnetic flux return path. These are formed as thin films of a soft magnetic material.

The main magnetic pole 2 has a forward end 2*a* facing the perpendicular magnetic recording medium and a rear end 2*b* magnetically coupled to the return yoke 3.

The return yoke 3 is larger in both thickness and width than the main magnetic pole 2 and has an area facing the perpendicular magnetic recording medium much larger than that of the main magnetic pole 2.

When writing signals in the double-layer perpendicular magnetic recording medium, the main magnetic pole 2 is magnetically energized so that a magnetic field perpendicular to the surface of a perpendicular magnetic recording film of the perpendicular magnetic recording medium is applied from the distal end 2*a* of the main magnetic pole 2. The result is that signals are written in the perpendicular recording magnetic film. At this time, the magnetic field traverses the high magnetic permeability layer provided below the perpendicular recording magnetic film to return to the return yoke 3 to complete a closed loop. Although the orientation of the magnetic field entering the return yoke 3 is opposite to that of the magnetic field from the main magnetic pole 2, the magnetic flux density is diminished because of the large facing surface of the return yoke 3 thus not affecting the signals written in the perpendicular recording magnetic film.

The main magnetic pole 2 and the return yoke 3 are formed by an amorphous alloy film such as a CoZrNb alloy film or a soft magnetic thin film, such as a crystalline film, for example, a fine FeN crystalline film. These films are formed by sputtering and patterned to a defined shape.

Although there is known a plating method as a method for forming the main magnetic pole 2 and the return yoke 3, if it is attempted to select a soft magnetic material on the premises that the plating method is to be used, the high frequency magnetic permeability is not optimum even granting that high saturation magnetic flux density is achieved to some extent. For improving high frequency magnetic permeability of the soft magnetic material, it is necessary to increase resistivity. However, high resistivity is not friendly to the plating process.

If the films are formed by a sputtering method, there is no constraint in selection of the soft magnetic material. On the other hand, the main magnetic pole 2 can be reduced significantly in thickness as compared to the pole used in the conventional induction type thin film magnetic head or a bulk type single pole magnetic head, so that the main magnetic pole 2 can be easily reduced in track width. The fact that the main magnetic pole 2 can be reduced in thickness is meritorious since the high frequency characteristics can be improved as compared to the case of the induction type thin film magnetic head even despite use of a soft magnetic material having comparable high frequency characteristics.

The main magnetic pole 2 needs to be magnetically energized at the time of writing signals, and a coil for that purpose is used. In the thin-film single magnetic pole head of the present invention, a thin-film coil for energizing the main magnetic pole 2 is formed by stacking strip-shaped conductor layers.

That is, a first conductor 8, a second conductor 9, the main magnetic pole 2 and a third conductor 10 are layered on the return yoke 3 with the interposition of insulating layers 4, 5, 6 and 7.

The first conductor 8, second conductor 9 and the third conductor 10 are formed parallel to one another so as to extend at right angles to the strip-shaped main magnetic pole 2, so that one side edges of the conductors 8 to 10 will face a perpendicular magnetic recording medium facing surface, as shown in FIG. 1, in which the insulating layers 4 to 7 are not shown for clarifying the connection structure of the first to third conductors 8 to 10.

The first to third conductors 8 to 10 are reduced in width in this order, with one end 10*a* of the third conductor 10 being electrically connected via a via-hole formed in the insulating layer to the first conductor 8 in an area which clears the second conductor 9.

The third conductor 10 has one end 10*a* connected to one end portion of the first conductor 8 and an opposite end 10*b* connected to an opposite end portion of the second conductor 9 via respective via-holes in the associated insulating layers. The conductors are thus connected in series with the third conductor 10 connected between the first and second conductors 8 and 9 about the magnetic pole 2, as best illustrated in FIG. 1.

If, in the above-described connection structure, the current is allowed to flow between terminals constituted by one end 8*a* of the first conductor 8 and one end 10*a* of the third conductor 10, the current first flows to the first conductor 8 across the lower part of the main magnetic pole 2. The current then flows into the third conductor 10 to flow through the upper part of the main magnetic pole 2 to flow in the opposite direction. The current then flows from the opposite end 10*b* of the third conductor 10 into the second conductor 9 to flow through the lower part of the main magnetic pole 2 in the same direction as the first conductor 8.

Thus, the current flows around the main magnetic pole 2 to establish a state of winding in the direction of film thickness of the main magnetic pole 2. In the present embodiment, a 1.5-turn thin film coil is placed around the main magnetic pole 2 by the first to third conductors 8 to 10.

Of course, the number of turns can be increased by increasing the number of conductor layers, such that optional designing can be made depending on the desired performance. There is, however, a spontaneous limitation in view of practical application because an excessive number of conductor layers complicates the film-forming process or the connection process.

Since the coil is arranged for sandwiching the main magnetic pole 2 in the direction of film thickness, it is possible to improve the magneto-motive force by a factor of two while maintaining low inductance. Moreover, since the thin-film coil is provided at the foremost part of the main magnetic pole 2 so that the coil faces the magnetic recording medium facing surface (so-called ABS surface), the distal end 2*a* of the main magnetic pole 2 can be operated without saturation during recording.

Although the thin-film coil is ideally formed facing the ABS surface only from the viewpoint of efficiency, the thin-film coil is preferably formed at a position receded from the ABS surface for purposes of insulation or protection of the respective conductors. Even in this case, it is desirable to form the conductor layers at a position as close to the ABS surface as possible in view of efficiency.

The number of conductor layers making up the thin-film coil is preferably formed in odd-numbered layers. In the present embodiment, the three layers, namely the first to third conductors 8 to 10, are used. By using the odd-numbered conductor layers, it becomes possible to form terminals for connection to the external circuit on both sides to assure facilitated lead-out of the lead wires. Although even-numbered conductor layers may be used and a terminal can be led out from a sole side, there is required wasteful wiring in order to separate the terminals from each other. This is not meritorious with respect to electrical resistance in consideration that the conductor layers are formed by thin films.

In the present embodiment, the conductors 8 to 10 making up the main magnetic pole 2 and the thin-film coils are surface-protected by a protective film 11 formed of, for example, alumina.

For further clarifying the structure of the thin-film single magnetic pole head of the present invention, the manufacturing process of the thin-film single magnetic pole head is hereinafter explained.

Figure 3:
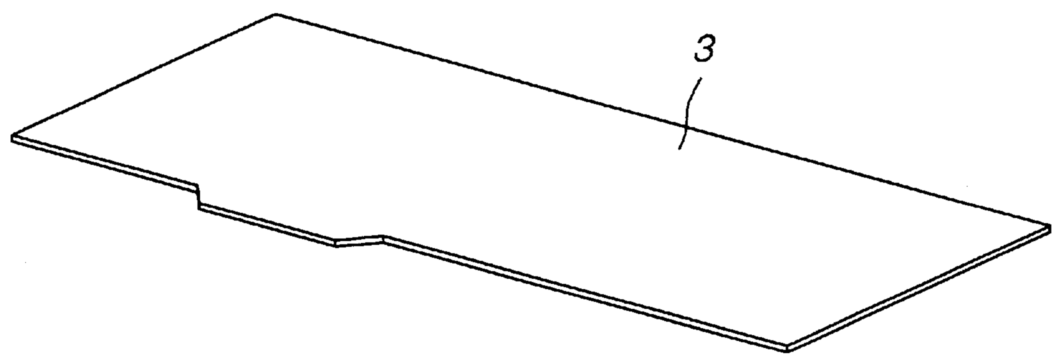
FIG. 3 shows a manufacturing process for the thin-film single magnetic pole head of the present invention, step-by-step, showing a return yoke forming process.

For fabricating the single magnetic pole head, a soft magnetic thin film is formed by sputtering on a slider (substrate), as shown in FIG. 3, and is dry-etched to a defined profile to prepare the return yoke 3. In the present embodiment, a CoZrNb thin film is formed to serve as the return yoke 3.

Figure 4:
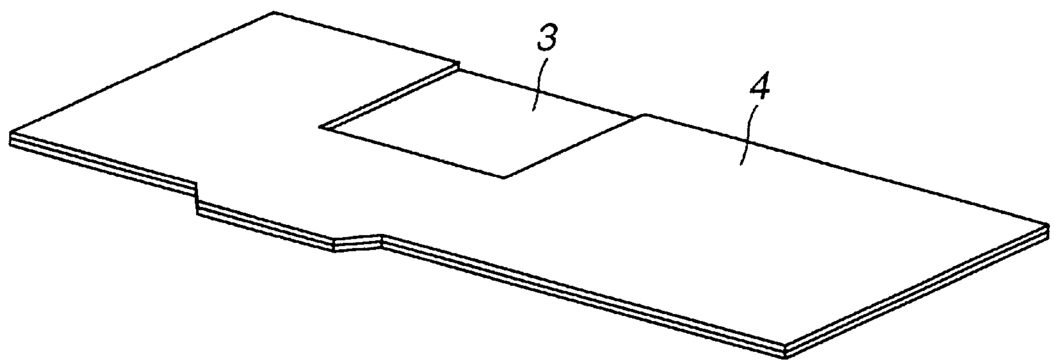
FIG. 4 is a schematic perspective view showing a first insulating layer forming step.

The first insulating layer 4 then is formed thereon, as shown in FIG. 4. The insulating layer 4 is formed by sputtering an oxide, such as alumina ($Al_2O_3$) or an oxide, such as $SiO_2$, and is dry-etched so that the insulating layer 4 is left only below the first conductor 8.

Figure 5:
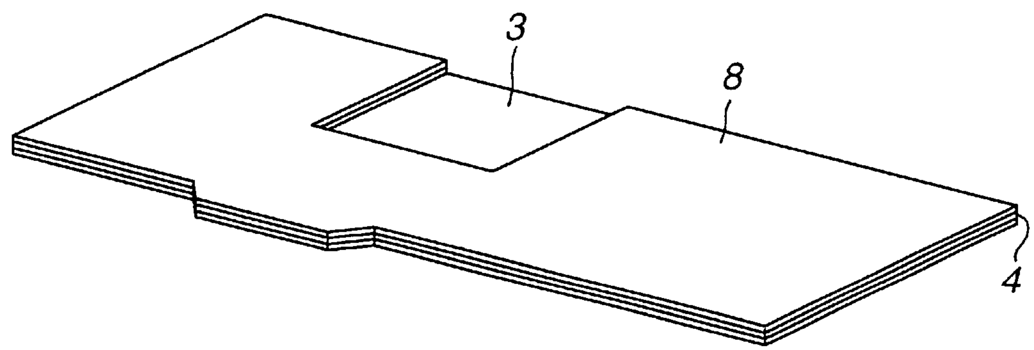
FIG. 5 is a schematic perspective view showing a first conductor forming process.

Then, a metal material of low resistivity for use as a conductor, such as copper, is sputtered, as shown in FIG. 5, and is dry-etched, using a patterned photoresist as a mask, in order to form the first conductor 8.

Figure 6:
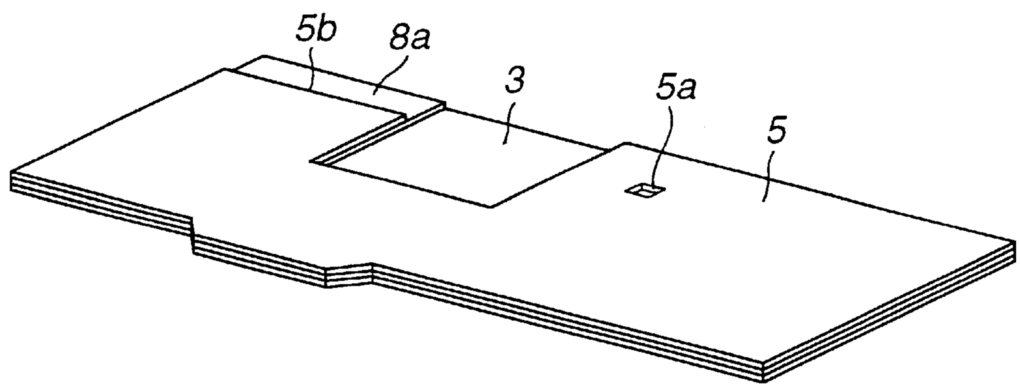
FIG. 6 is a schematic perspective view showing a second conductor forming process.
Figure 7:
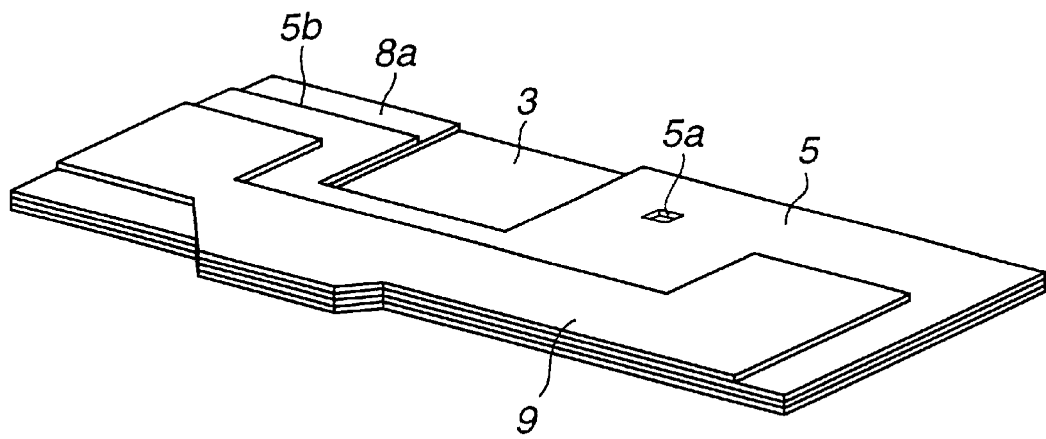
FIG. 7 is a schematic perspective view showing a second conductor forming process.

The second insulating layer 5 is then formed for insulating the second conductor 9 and the first conductor 8, formed thereon, from each other, as shown in FIG. 6. The second insulator 5 is formed to conform substantially to the profile of the first conductor 8 by the material and the process similar to those of the first insulating layer 4. It is noted however that a via-hole 5*a* for interconnecting the third conductor 10 and the first conductor 8 and a via-hole 5*b* for exposing an end 8*a* of the first conductor 8 as a connection terminal are formed during patterning.

The second insulating layer 6 then is formed by the same technique as used for forming the first conductor 8. It is noted however than the second conductor 9 is narrower in width than the first conductor 8 and is formed so as to clear the via-hole 5*a* formed in the second insulating layer 5.

Figure 8:
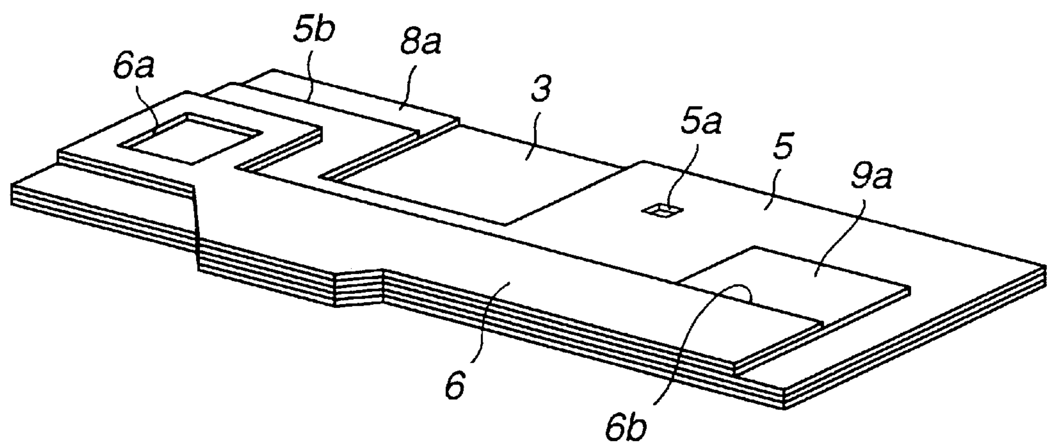
FIG. 8 is a schematic perspective view showing a third conductor forming process.
Figure 9:
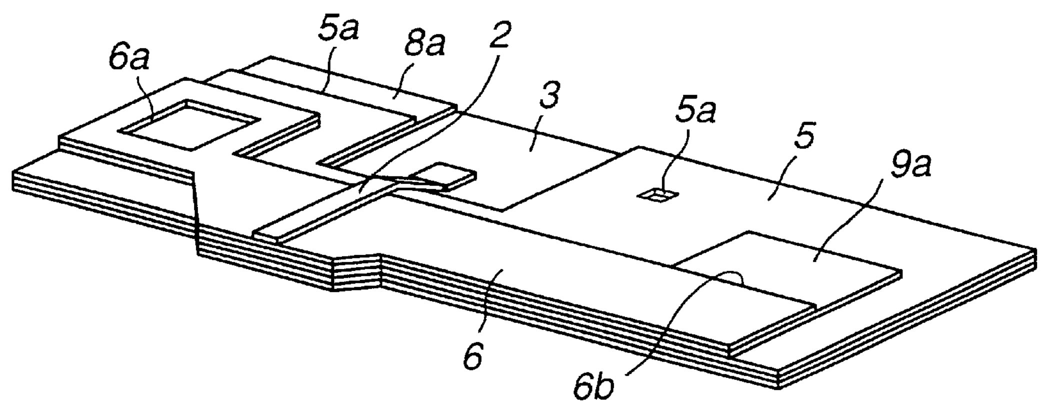
FIG. 9 is schematic perspective view showing a main magnetic pole forming process.

The third insulating layer 6 is then formed, as shown in FIG. 8. This third insulating layer 6 is formed by sputtering a material similar to the material of the other insulating layers and by patterning the resulting layer to conform to the profile of the second conductor 9. At this time, a via-hole 6*b* for exposing the via-hole 6*a* for connection to the third conductor 10 and a via-hole 6*b* for exposing an end 9*a* of the second conductor 9 as a connection terminal are formed by patterning.

On the third insulating layer 6 is formed the main magnetic pole 2. This main magnetic pole 2 is formed by patterning the resulting layer in conformity to the second conductor 9. At this time, the connection hole 6*a* to the third conductor 10 and the connection hole 6*b* for exposing the end 9*a* of the second conductor 9 as a connection terminal are formed by patterning.

The main magnetic pole 2 is formed on the third insulating layer 2. Similarly to the return yoke 3, the main magnetic pole 2 is formed by film-forming and patterning a CoZrNb amorphous film, and is patterned to the shape of a strip extending along the depth-wise direction relative to the ABS surface.

Since the majority of the main magnetic pole 2 is formed on a planar surface, it is possible to suppress deterioration of magnetic characteristics, while fine patterning can be realized easily.

Figure 10:
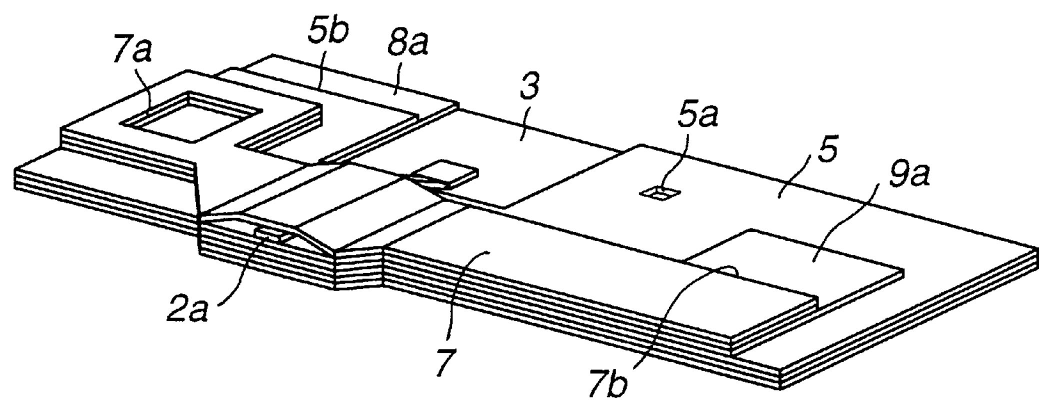
FIG. 10 is a schematic perspective view showing a fourth conductor forming process.

After forming the main magnetic pole 2, a fourth insulating layer 7 for insulating the main magnetic pole 2 and the third conductor 10 from each other is formed, as shown in FIG. 10. This fourth insulating layer 7 is similar in profile to the third insulating layer 6. Therefore, a via-hole 7*a* for connection to the third conductor 10 and a via-hole 7*b* for exposing the end 9*a* of the second conductor 9 as a connection terminal are formed in this fourth insulating layer 7 by patterning.

Figure 11:
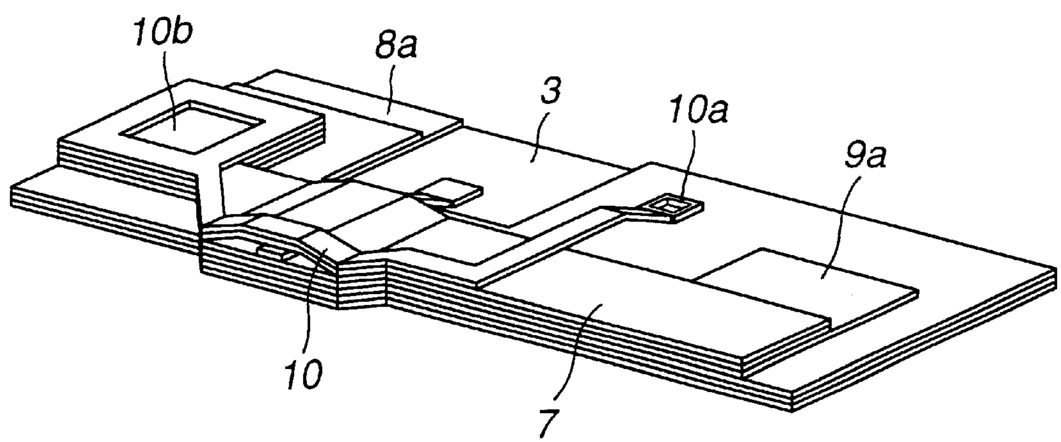
FIG. 11 is a schematic perspective view showing a third conductor forming process.

The third conductor 10 is then formed astride the main magnetic pole 2, with the interposition of the fourth insulating layer 7, as shown in FIG. 11. The third conductor 10 is electrically connected with the first conductor 8 and the second conductor 9 via the via-hole 5*a* formed in the second insulating layer 5 and via via-holes 6*a*, 7*a* formed in the third and fourth insulating layers 6, 7, in order to complete a 1.5 turn of the thin-film coil.

Finally, terminal ends 8*a*, 9*a* of the first and second conductors 8 and 9 are plated by, for example, pattern plating, for forming terminals, and a protective film for protecting the main magnetic pole 2 during use or processing are formed to complete the main magnetic pole 2. The protective film is formed by sputtering an oxide, such as sputtering, and terminals are exposed by subsequently lapping.

The thin-film single magnetic pole head was tentatively prepared, using the above-described manufacturing process for the thin-film single magnetic pole head, in order to measure electromagnetic conversion characteristics. With the thin-film single magnetic pole head, tentatively prepared, the main magnetic pole 2 was of the film thickness of 0.4 μm, while the return yoke 3 was of the film thickness of 3 μm.

First, the inductance of the thin-film single magnetic pole head, tentatively prepared, was measured, and found to be 10 nH (15 MHz, 1 mA). This value is drastically smaller than the value (of the order of 2 μH) of the conventional bulk type single magnetic pole head or the value (of the order of 100 to 150 nH) of the induction type thin-film magnetic head.

Figure 12:
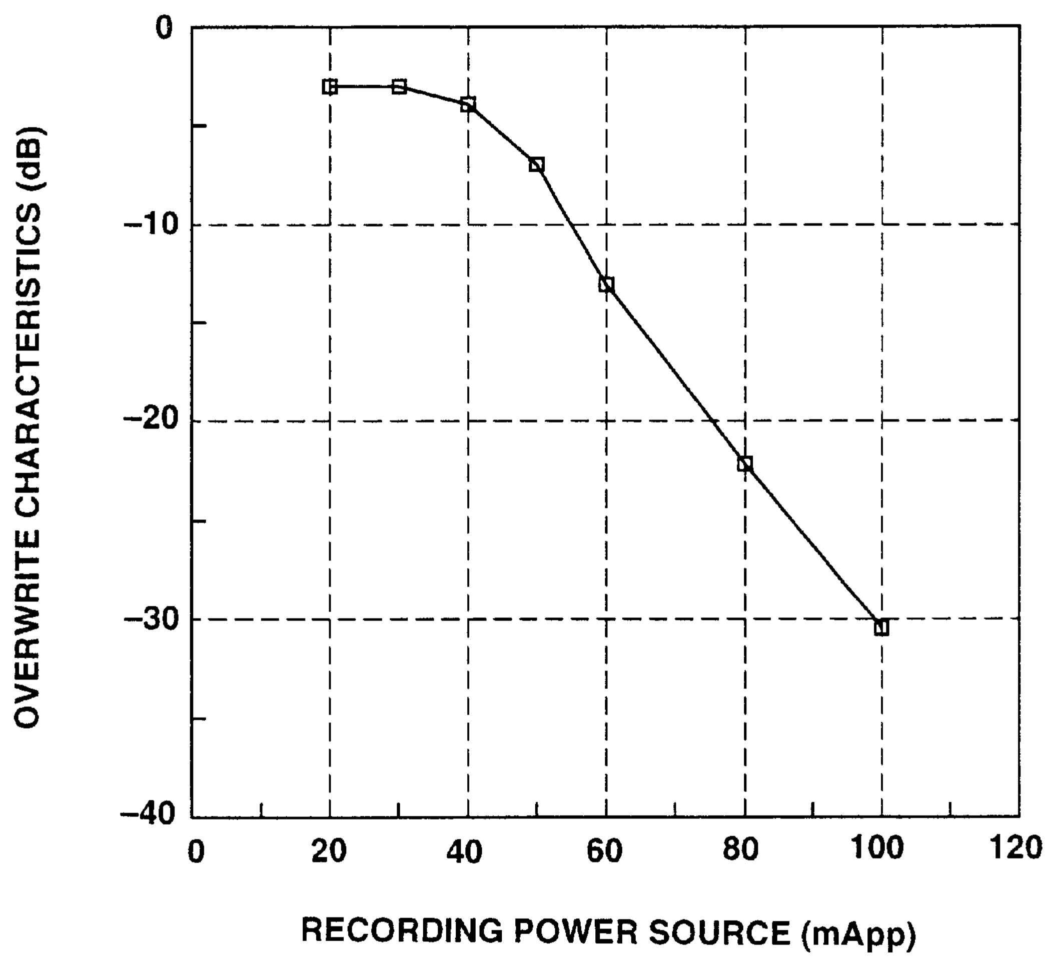
FIG. 12 is a curve showing overwrite characteristics of a thin-film single magnetic pole head manufactured for trial.

Also, the single magnetic pole magnetic head, tentatively prepared, was combined with a double-layer perpendicular magnetic recording medium, in order to check overwrite characteristics (recording current saturation characteristics) of the tentatively prepared thin-film single magnetic pole head. The results are shown in FIG. 12, from which it is seen that overwrite characteristics of −30 dB can be obtained for the recording current of 100 mApp, thus indicating that the combined film can be sufficiently used for overwriting.

It is seen from the above measured results that, with the thin-film single magnetic pole head of the present invention, the inductance can be lowered without impairing recording characteristics. Also, since the main magnetic pole is of the film thickness of 0.4 μm, instead of approximately 3 μm of the induction type thin-film magnetic head, high-frequency characteristics of recording can be improved sufficiently.

The thin-film single magnetic pole head of the present invention, the basic structure of which has been explained in the above, may be combined, as a recording head, with a magneto-resistance effect element (MR element), as a playback head, in order to provide a compound head.

Figure 13:
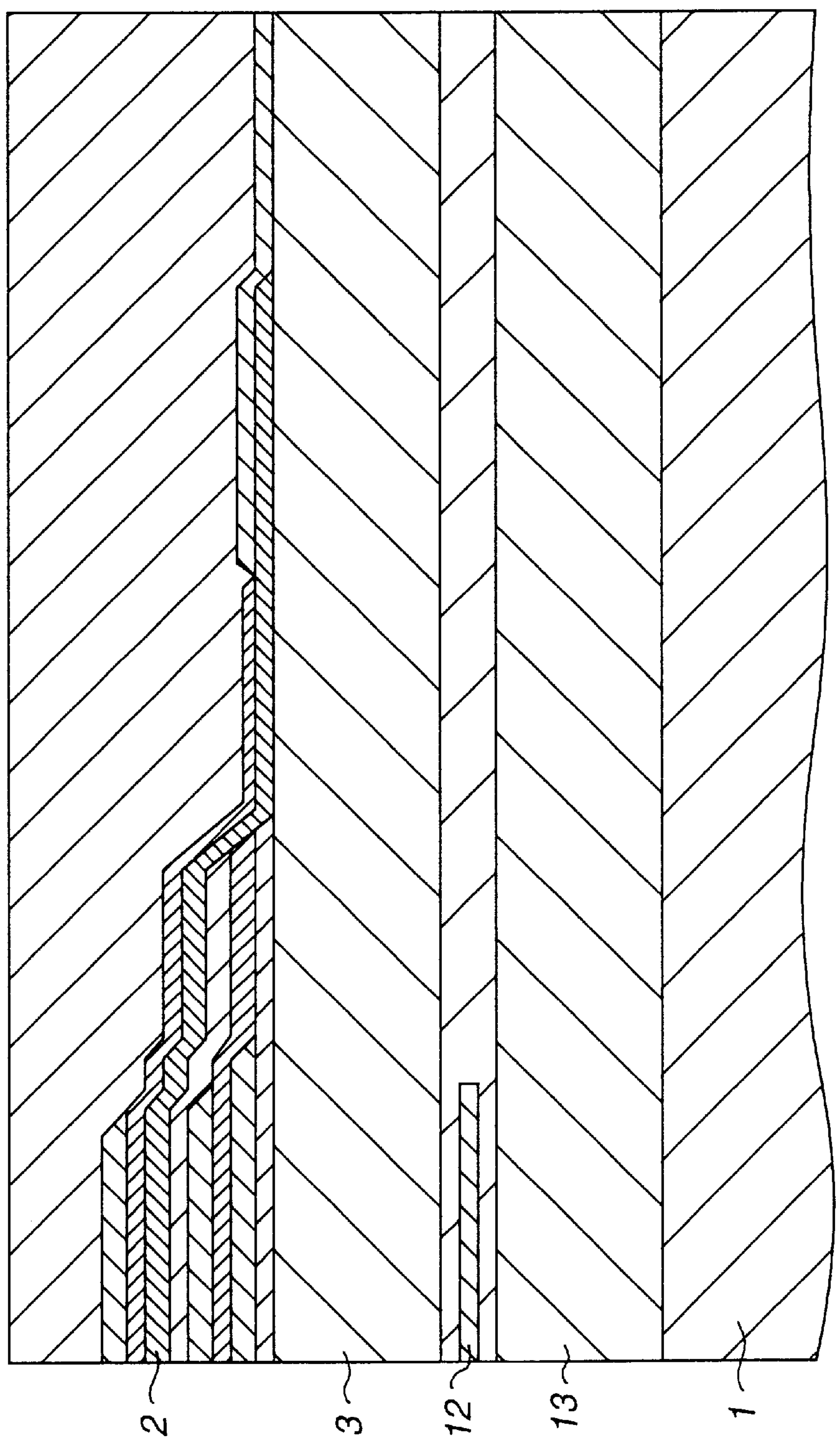
FIG. 13 is a schematic cross-sectional view showing an illustrative structure of ahead combined with a playback head formed by MR elements.

FIG. 13 shows the basic structure of the compounded head in which an MR element 12 is arranged below the previously explained thin-film single magnetic pole head so as to be used as a playback head.

The return yoke 3 of the thin-film single magnetic pole head may be used simultaneously as an upper-layer shield. Therefore, it suffices if only a lower layer shield 13 is formed as a shield of the MR element 12.

Although the structure of the thin-film single magnetic pole head of the present invention has been explained in the foregoing, the present invention is not to be limited to this illustrative structure and may be modified suitably without departing from the scope of the invention.

What is claimed is:

1. A thin-film, single magnetic pole, magnetic head, comprising:

a thin film main magnetic pole made of a soft magnetic thin film, said main magnetic pole extending from a rear end to a forward end at a magnetic recording medium facing surface thereby to extend substantially perpendicular to said magnetic recording medium facing surface;

a thin film return yoke under said magnetic pole; and a thin-film coil for energizing the main magnetic pole, said coil comprising overlying first through third thin film conductor layers in that order, said conductor layers extending substantially parallel to one another, said conductor layers being layered with portions extending on both sides of the main magnetic pole and thereby extending substantially at a right angle to said main magnetic pole, said conductor layers layered in an up-and-down relationship relative to said yoke and said magnetic pole with said first conductor layer closer to said yoke than said third conductor layer, said conductor layers being selectively interconnected so as to be connected in series, said conductor layers being arranged in the vicinity of said magnetic recording medium facing surface, and lateral edges of said conductor layers facing the magnetic recording medium facing surface, wherein, as measured from said rear end to said magnetic recording medium face, said second conductor layer is wider than said third conductor layer and said first conductor layer is wider than said second conductor layer.

2. A thin-film, single magnetic pole, magnetic head, comprising:

a thin film main magnetic pole made of a soft magnetic thin film, said main magnetic pole extending from a rear end to a forward end at a magnetic recording medium facing surface thereby to extend substantially perpendicular to said magnetic recording medium facing surface;

a thin film return yoke under said magnetic pole; and a thin-film coil for energizing the main magnetic pole, said coil comprising overlying first through third thin film conductor layers in that order, said conductor layers extending substantially parallel to one another, said conductor layers being layered with portions extending on both sides of the main magnetic pole and thereby extending substantially at a right angle to said main magnetic pole, said conductor layers layered in an up-and-down relationship relative to said yoke and said magnetic pole with said first conductor layer closer to said yoke than said third conductor layer, said conductor layers being selectively interconnected so as to be connected in series, said conductor layers being arranged in the vicinity of said magnetic recording medium facing surface, and lateral edges of said conductor layers facing the magnetic recording medium facing surface, wherein, said coil effectively constitutes a 1.5 turn coil around said magnetic pole.

* * * * *